United States Patent
Zheng et al.

(10) Patent No.: US 9,313,494 B2
(45) Date of Patent: Apr. 12, 2016

(54) PARALLELIZATION FRIENDLY MERGE CANDIDATES FOR VIDEO CODING

(75) Inventors: Yunfei Zheng, Cupertino, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 829 days.

(21) Appl. No.: 13/526,261

(22) Filed: Jun. 18, 2012

(65) Prior Publication Data

US 2013/0077691 A1    Mar. 28, 2013

Related U.S. Application Data

(60) Provisional application No. 61/499,112, filed on Jun. 20, 2011, provisional application No. 61/543,043, filed on Oct. 4, 2011, provisional application No. 61/543,059, filed on Oct. 4, 2011, provisional application No. 61/556,761, filed on Nov. 7, 2011, provisional application No. 61/562,387, filed on Nov. 21, 2011, provisional application No. 61/562,953, filed on Nov. 22, 2011.

(51) Int. Cl.
*H04N 7/36* (2006.01)
*H04N 19/51* (2014.01)
(Continued)

(52) U.S. Cl.
CPC ....... *H04N 19/00696* (2013.01); *H04N 19/103* (2014.11); *H04N 19/105* (2014.11); *H04N 19/109* (2014.11); *H04N 19/11* (2014.11); *H04N 19/17* (2014.11); *H04N 19/176* (2014.11); *H04N 19/436* (2014.11); *H04N 19/51* (2014.11); *H04N 19/52* (2014.11); *H04N 19/577* (2014.11); *H04N 19/593* (2014.11); *H04N 19/70* (2014.11)

(58) Field of Classification Search
None
See application file for complete search history.

(56) References Cited

U.S. PATENT DOCUMENTS

| | | |
|---|---|---|
| 7,940,844 B2 | 5/2011 | Lai et al. |
| 8,369,628 B2 | 2/2013 | Suzuki et al. |

(Continued)

FOREIGN PATENT DOCUMENTS

| | | |
|---|---|---|
| RU | 2391794 C2 | 6/2010 |
| WO | 2011019253 A2 | 2/2011 |

(Continued)

OTHER PUBLICATIONS

Zheng et al., "Simplification and improvement of additional merge candidate," JCT-VC Meeting; MPEG Meeting; Nov. 21, 2011-Nov. 30, 2011; Geneva, CH; (Joint Collaborative Team on Video Coding (JCT-VC) of ITU-T SG.16 WP3 and ISO/IEC JTC1/SC29/WG11); URL:http://wftp3.itu.int/av-arch/jctvc-site/, No. JCTVC-G683, XP030110667, pp. 1-8, 8 pp.

(Continued)

*Primary Examiner* — Sath V Perungavoor
*Assistant Examiner* — Janese Duley
(74) *Attorney, Agent, or Firm* — Shumaker & Sieffert, P.A.

(57) ABSTRACT

This disclosure presents methods and systems for coding video in merge mode of a motion vector prediction process. A method of coding video data may determining a merge candidate set for a current prediction unit of a current coding unit, wherein the merge candidate set is determined without comparing motion information of a merge candidate in the merge candidate set to motion information of any other prediction units, and performing a merge motion vector prediction process for the current prediction unit using the merge candidate set. The method may further comprise excluding merge candidates from the merge candidate set that are within another prediction unit of the current coding unit.

22 Claims, 10 Drawing Sheets

(51) Int. Cl.

| | |
|---|---|
| *H04N 19/105* | (2014.01) |
| *H04N 19/52* | (2014.01) |
| *H04N 19/176* | (2014.01) |
| *H04N 19/70* | (2014.01) |
| *H04N 19/593* | (2014.01) |
| *H04N 19/11* | (2014.01) |
| *H04N 19/103* | (2014.01) |
| *H04N 19/109* | (2014.01) |
| *H04N 19/17* | (2014.01) |
| *H04N 19/436* | (2014.01) |
| *H04N 19/577* | (2014.01) |

(56) References Cited

U.S. PATENT DOCUMENTS

| | | | |
|---|---|---|---|
| 2006/0120455 | A1 | 6/2006 | Park et al. |
| 2006/0140275 | A1 | 6/2006 | Lee et al. |
| 2008/0043843 | A1 | 2/2008 | Nakaishi |
| 2008/0117978 | A1 | 5/2008 | Kapasi et al. |
| 2009/0129472 | A1 | 5/2009 | Panusopone et al. |
| 2011/0096826 | A1* | 4/2011 | Han .................. H04N 19/00684 375/240.01 |
| 2011/0176615 | A1 | 7/2011 | Lee et al. |
| 2012/0008676 | A1 | 1/2012 | Lee et al. |
| 2012/0008688 | A1 | 1/2012 | Tsai et al. |
| 2012/0134416 | A1* | 5/2012 | Lin .................. H04N 19/52 375/240.16 |
| 2012/0189055 | A1* | 7/2012 | Chien .................. H04N 19/52 375/240.14 |
| 2012/0263235 | A1* | 10/2012 | Sugio .................. H04N 19/513 375/240.16 |
| 2013/0287116 | A1* | 10/2013 | Helle et al. .............. 375/240.24 |
| 2014/0286395 | A1* | 9/2014 | Lee .................. H04N 19/137 375/240.02 |

FOREIGN PATENT DOCUMENTS

| | | |
|---|---|---|
| WO | WO2011047994 A1 | 4/2011 |
| WO | 2012030193 A2 | 3/2012 |
| WO | 2012059577 A1 | 5/2012 |

OTHER PUBLICATIONS

Bross et al., "High efficiency video coding (HEVC) text specification draft 7," 9th Meeting: Geneva, CH, Apr. 27-May 7, 2012, JCTVC-I1003d2, 290 pp.

Bross et al., "High efficiency video coding (HEVC) text specification draft 8," 10th Meeting: Stockholm, SE, Jul. 11-20, 2012, JCTVC-J1003d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "WD4: Working Draft 4 of High-Efficiency Video Coding," 6th Meeting: JCTVC-F803d2, Torino, IT, Jul. 14-22, 2011, 226 pp.

Bross et al., "WD5: Working Draft 5 of High-Efficiency Video Coding," 7th Meeting: Geneva, CH, Nov. 12-30, 2011, JCTVC-G1103d2, 214 pp.

International Preliminary Report on Patentability—PCT/US2012/043155, The International Bureau of WIPO—Geneva, Switzerland, Sep. 24, 2013, 11 pp.

International Search Report and Written Opinion—PCT/US2012/043155—ISA/EPO—Sep. 27, 2012, 15 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kim H Y. et al., "CU-based Merge Candidate List Construction," Document: JCTVC-G416, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Date Saved: Nov. 9, 2011, XP030110400, pp. 1-13.

Liu et al., "Method and syntax for partial CU merge", MPEG Meeting; 5th Meeting, Mar. 16-23, 2011, Geneva, CH; (Motion Picture Expert Group or ISO/IEC JTCI/SC29/WG11), No. m19599, XP030048166, pp. 1-5.

Mathew et al., "Quad-Tree Motion Modeling With Leaf Merging," IEEE Transactions on Circuits and Systems for Video Technology, IEEE Service Center, Piscataway, NJ, US, vol. 20, No. 10, Oct. 2010, XP011318748, ISSN: 1051-8215, pp. 1331-1345, 15 pp.

McCann et al., "High Efficiency Video Coding (HEVC) Test Model 2 (HM 2) Encoder Description," 20110128, No. JCTVC-D502, Jan. 28, 2011, XP002679641, Retrieved from the Internet: URL: http://wftp3.itu.int/av-arch/jctvc-site/2011_01_D_Daegu/ [retrieved on Jul. 11, 2012], 26 pp.

Wiegand et al., "WD1: Working Draft 1 of High-Efficiency Video Coding," JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Zheng et al., "CE9: Unified Merge and AMVP candidates selection (UNI03)", JCT-VC Meeting; MPEG Meeting; Jul. 14, 2011-Jul. 22, 2011; Torino, IT; (Joint Collaborative Team on Video Coding of ITU-T SG.16 WP3 and ISO/IEC JTC1/SC29/WG11) URL: http://wftp3.itu.int/av-arch/jctvc-site/ No. JCTVC-F297, XP030009320, 12 pp.

Zheng et al., "Simplified Merge candidate derivation," JCT-VC Meeting; MPEG Meeting; Nov. 21-30, 2011; Geneva, CH; (Joint Collaborative Team on Video Coding of ITU-T SG16 WP3 and ISO/IEC JTCI/SC29/WG11; URL:http://wftp3.itu.int/av-arch/jctvc-site/, No. JCTVC-G681, XP030110665, 5 pp.

Zheng et al., "Merge Candidate Selection in 2NxN, Nx2N, and NxN Mode," MPEG Meeting; 6th Meeting, Torino, IT, Jul. 14-22, 2011; (Motion Picture Expert Group or ITU-T SG16 WP3 and ISO/IEC JTCI/SC29/WG11), JCTVC-F302, No. m20723, date saved: Jul. 7, 2011, XP030049286, 6 pp.

Zheng et al., "Unified Motion Vector Predictor Selection for Merge and AMVP", MPEG Meeting; 5th Meeting, Mar. 16-23, 2011; Geneva, CH; (Motion Picture Expert Group or ITU-T SG16 WP3 and ISO/IEC JTC1/SC29/WG11), No. m19932, JCTVC-E396, XP030048499, 5 pp.

Bross et al., "High Efficiency Video Coding (HEVC) text specification draft 9," 11th Meeting: Shanghai, CN, Oct. 10-19, 2012, JCTVC-K1003v7, 290 pp.

Bross et al., "High Efficiency Video Coding (HEVC) text specification draft 10 (for FDIS & Last Call)," 12th Meeting: Geneva, CH, Jan. 14-23, 2013, JCTVC-L1003v34, 310 pp.

Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/043155, dated Jun. 6, 2013, 9 pp.

Han et al., "Improved Video Compression Efficiency Through Flexible Unit Representation and Corresponding Extension of Coding Tools," IEEE Transactions on Circuits and Systems for Video Technology, vol. 20, No. 12, Dec. 2010, 12 pp.

Lin, et al., "Parallel NxN merge mode", [online], Apr. 16, 2012, Joint Collaborative Team on Video Coding (JCT-VC) of ITU-T SG 16 WP 3 and ISO/IEC JTC 1/SC 29/WG 11, Document: JCTVC-I0180 (version 1), 4 pp.

McCann, et al., "High Efficiency Video Coding (HEVC) Test Model 2 (HM 2) Encoder Description", [online], Joint Collaborative Team on Video Coding (JCT-VC) of ITU-T SG16 WP3 and ISO/IEC JTC1/SC29/WG11, Document: JCTVC-D502 (version 2), Oct. 7-15, 2010, 28 pp.

* cited by examiner

MERGE MODE

No Merge Candidates Are Removed/Excluded

PARALLELIZATION FRIENDLY MERGE CANDIDATES FOR VIDEO CODING

This application claims the benefit of U.S. Provisional Application No. 61/499,112, filed Jun. 20, 2011, U.S. Provisional Application No. 61/543,043, filed Oct. 4, 2011, U.S. Provisional Application No. 61/543,059, filed Oct. 4, 2011, U.S. Provisional Application No. 61/556,761, filed Nov. 7, 2011, U.S. Provisional Application No. 61/562,387, filed Nov. 21, 2011, and U.S. Provisional Application No. 61/562,953, filed Nov. 22, 2011, all of which are hereby incorporated by reference in their entirety.

TECHNICAL FIELD

This disclosure relates to video coding, and more particularly to techniques for determining a set of motion vector prediction candidates in a motion vector prediction process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between pixel values in the coded block and reference samples in the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. This disclosure describes techniques for determining a set of merge candidates in a merge mode motion vector prediction process.

In some examples, this disclosure proposes generating a merge candidate set for a current prediction unit of a coding unit without comparing the motion information of any merge candidates with the motion information of any other prediction units in the same coding unit. In this way, merge candidate sets for multiple prediction units of coding unit may be generated in parallel, as the generation of specific merge candidate does not rely on a comparison to motion vector information in other prediction units that may or may not have been already determined.

This disclosure further proposes to remove merge candidates from a merge candidate set for a current prediction unit that are contained within another prediction unit of the same coding unit. In this way, the likelihood that all prediction units of one coding unit will use the same motion vector information is limited, thus preserving the advantage of partitioning a coding unit into multiple prediction units.

In one example of the disclosure, a method of coding video data comprises determining a merge candidate set for a current prediction unit of a current coding unit, wherein the merge candidate set is determined without comparing motion information of a merge candidate in the merge candidate set to motion information of any other prediction units, and performing a merge motion vector prediction process for the current prediction unit using the merge candidate set. The method may further comprise excluding merge candidates from the merge candidate set that are within another prediction unit of the current coding unit.

In another example of the disclosure, an apparatus configured to code video data comprises a video coder configured to determine a merge candidate set for a current prediction unit of a current coding unit, wherein the merge candidate set is determined without comparing motion information of a merge candidate in the merge candidate set to motion information of any other prediction units, and to perform a merge motion vector prediction process for the current prediction unit using the merge candidate set. The video coder may be further configured to remove merge candidates from the merge candidate set that are within another prediction unit of the current coding unit.

In another example of the disclosure, an apparatus configured to code video data comprises means for determining a merge candidate set for a current prediction unit of a current coding unit, wherein the merge candidate set is determined without comparing motion information of a merge candidate in the merge candidate set to motion information of any other prediction units, and means for performing a merge motion vector prediction process for the current prediction unit using the merge candidate set. The apparatus may further comprise means for excluding merge candidates from the merge candidate set that are within another prediction unit of the current coding unit.

In another example of the disclosure, a computer-readable storage medium having stored thereon instructions that when executed cause one or more processors configured to code video data is proposed. The instructions cause the one or more processors to determine a merge candidate set for a current prediction unit of a current coding unit, wherein the merge candidate set is determined without comparing motion information of a merge candidate in the merge candidate set to motion information of any other prediction units, and to perform a merge motion vector prediction process for the current prediction unit using the merge candidate set. The instructions may further cause the one or more processors to remove merge candidates from the merge candidate set that are within another prediction unit of the current coding unit.

The details of one or more examples are set forth in the accompanying drawings and the description below. Other features, objects, and advantages will be apparent from the description and drawings, and from the claims.

DETAILED DESCRIPTION

Figure 1:
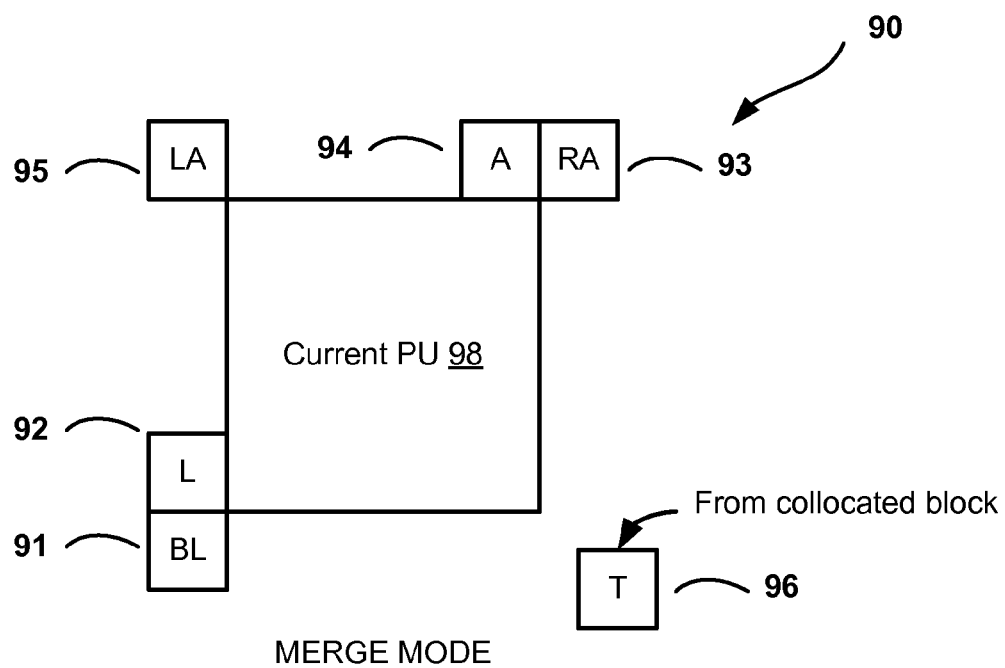
FIG. 1 is a conceptual drawing illustrating candidate blocks for motion vector prediction according to merge mode.
Figure 1:
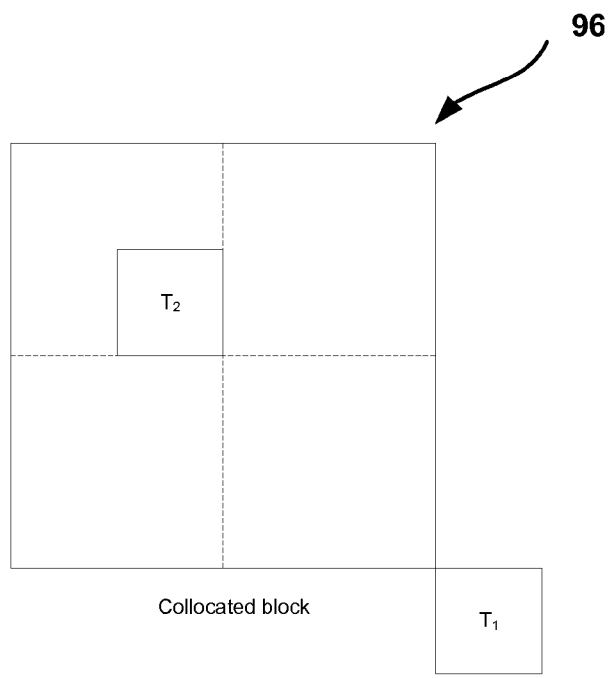

In general, this disclosure describes techniques for coding video data. This disclosure describes techniques for determining a merge candidate set in a merge mode motion vector prediction process.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

There is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 1, 2012, is downloadable from http://phenix.int-evry.fr/jct/doc_end_user/documents/8_San%20Jose/wg11/JCTVC-H1003-v22.zip.

For video coding according to the high efficiency video coding (HEVC) standard currently under development by the Joint Cooperative Team for Video Coding (JCT-VC), a video frame may be partitioned into coding units. A coding unit (CU) generally refers to an image region that serves as a basic unit to which various coding tools are applied for video compression. A CU usually has a luminance component, which may be denoted as Y, and two chroma components, which may be denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264.

To achieve better coding efficiency, a coding unit may have variable sizes depending on video content. In addition, a coding unit may be split into smaller blocks for prediction or transform. In particular, each coding unit may be further partitioned into prediction units (PUs) and transform units (TUs). Prediction units may be considered to be similar to so-called partitions under other video coding standards, such as H.264. Transform units (TUs) refer to blocks of residual data to which a transform is applied to produce transform coefficients.

Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-four intra-prediction encoding modes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is not predictively coded, intra-prediction mode encoded, or inter-prediction mode encoded. For intra coding, a PU may be treated the same as a leaf transform unit described below.

To code a block (e.g., a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same frame, and other prediction units may be inter-coded (P or B) with respect to reference blocks in other frames.

Upon identification of a predictor, the difference between the original video data block and its predictor is calculated. This difference is also called the prediction residual, and refers to the pixel differences between the pixels of the block to be coded and corresponding reference samples (which may be integer-precision pixels or interpolated fractional-precision pixels) of the reference block, i.e., predictor. To achieve better compression, the prediction residual (i.e., the array of pixel difference values) is generally transformed, e.g., using a discrete cosine transform (DCT), integer transform, Karhunen-Loeve (K-L) transform, or other transform.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may be interpolated, in whole or in part, and occur at a fractional pixel position. Upon finding a portion of the reference frame that best matches the current portion, the encoder determines the current motion vector for the current portion as the difference in the location from the current portion to the matching portion in the reference frame (e.g., from the center of the current portion to the center of the matching portion).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

In some instances, rather than directly signaling the original motion vector, the encoder may predict a motion vector for each PU. In this disclosure, the term "block" may be used generically to refer to a CU, PU or a TU. In performing a motion vector prediction process, the encoder may select a set of candidate motion vectors determined for spatially neighboring blocks in the same frame as the current PU or a candidate motion vector determined for a co-located PU in a reference frame. The encoder may perform motion vector prediction to select a particular candidate motion vector, and if needed, signal a syntax element indicating a selected motion vector candidate to reduce bit rate in signaling. The candidate motion vectors from the spatially neighboring blocks may be referred to as spatial MVP candidates, whereas the candidate motion vector from the co-located block in another reference frame may be referred to as a temporal MVP candidate.

The techniques of this disclosure are directed to the "merge" mode of motion vector prediction. In merge mode, a video encoder instructs a decoder, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected candidate motion vector for a current portion of the frame. This is accomplished by signaling in the bitstream an index into a candidate motion vector set identifying the selected candidate motion vector (i.e., the particular spatial MVP candidate or temporal MVP candidate). The candidate motion vector set may be derived through default settings or inferred from certain coding parameters. Thus, for merge mode, the prediction syntax may include a flag identifying the mode (in this case "merge" mode) and an index identifying the selected candidate motion vector. In some instances, the candidate motion vector will be in a causal PU in reference to the current PU. That is, the candidate motion vector will have already been decoded by the decoder. As such, the decoder has already received and/or determined the motion vector, reference index, and motion prediction direction for the causal PU. As such, the decoder may simply retrieve the motion vector, reference index, and motion prediction direction associated with the causal PU from memory and copy these values for the current PU. To decode a block in merge mode, the decoder obtains the predictor block using the motion vector prediction, and adds the residual data to the predictor block to reconstruct the coded block.

Once motion estimation is performed to determine a motion vector for a current portion, the encoder compares the matching portion in the reference frame to the current portion. This comparison typically involves subtracting the portion (which is commonly referred to as a "reference sample") in the reference frame from the current portion and results in so-called residual data, as mentioned above. The residual data indicates pixel difference values between the current portion and the reference sample. The encoder then transforms this residual data from the spatial domain to a transform domain, such as the frequency domain. Usually, the encoder applies a discrete cosine transform (DCT) to the residual data to accomplish this transformation. The encoder performs this transformation in order to facilitate the compression of the residual data because the resulting transform coefficients represent different frequencies, wherein the majority of energy is usually concentrated on a few low frequency coefficients.

Typically, the resulting transform coefficients are grouped together in a manner that enables run-length encoding, especially if the transform coefficients are first quantized (rounded). The encoder performs this run-length encoding of the quantized transform coefficients and then performs statistical lossless (or so-called "entropy") encoding to further compress the run-length coded quantized transform coefficients.

After performing lossless entropy coding, the encoder generates a bitstream that includes the encoded video data. This bitstream also includes a number of prediction syntax elements in certain instances that specify whether, for example, motion vector prediction was performed, the motion vector mode, and a motion vector predictor (MVP) index (i.e., the index of the candidate portion with the selected motion vector). The MVP index may also be referred to as its syntax element variable name "mvp_idx."

FIG. 1 shows a candidate motion vector set 90 currently proposed in the HEVC standard for use in merge mode. Merge mode uses six merge candidates from the following spatial and temporal blocks: the below left (BL) block 91, the left (L) block 92, the right above (RA) block 93, the above (A) block 94, the left above (LA) block 95, and the temporal block (T) 96. The candidate motion vectors associated with these blocks are used for determining a motion vector predictor in merge mode.

Temporal block 96 may be within a co-located block in a different frame than current PU (e.g., $T_2$) or adjacent to a co-located block in a different frame than the current PU 108 (e.g., $T_1$). The locations of the spatial candidate blocks (i.e., BL, L, LA, A, and RA) depicted in FIG. 1 are not absolute positions, but rather are relative positions to current PU 98 based on the following general definitions. It should be noted that the candidate blocks need not be the nearest possible block that meets the following definitions, but may be any PU that meets the definitions. The LA candidate block 95 is located above a top line defining the current PU and to the left of a left line defining the current PU. The L candidate block 92 is located to the left of a left line defining the current PU, but also above a bottom line defining the current PU and below a top line defining the current PU. The BL candidate block 91 is located below a bottom line defining the current PU and to the left of a left line defining the current PU. The A candidate block 94 is located above a top line defining the current PU, but also to the right of a left line defining the current PU and to the left of a right line defining the current PU. The RA candidate block 93 is located to the right of a right line defining the current PU and above a top line defining the current PU.

Figure 2:
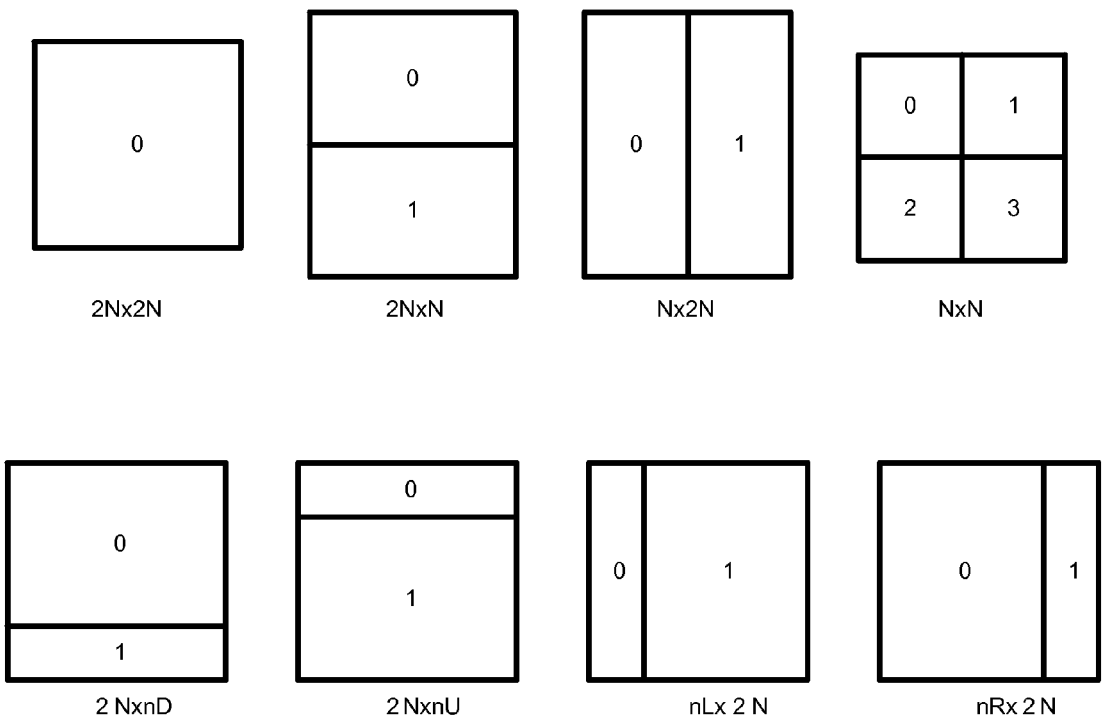
FIG. 2 is a conceptual drawing illustrating example partition types.

Merge candidates are generated per PU. That is, each PU has its own set of merge candidates. This includes PUs that are partitioned from a larger CU. The example of FIG. 1 is for a 2N×2N partitioned PU (e.g., a square PU). FIG. 2 shows further examples of prediction units with different partition types. As shown in FIG. 2, a 2N×2N partition is a square-shaped partition. Essentially, it is a PU from an unpartitioned CU. A 2N×N partition is made by dividing a square CU into two horizontally oriented PUs, where PU 0 is on top of PU 1. An N×2N partition is made by dividing a square CU into two vertically oriented PUs, where PU 0 is to the left of PU 1. An N×N partition is made by dividing a square CU into four equally sized PUs. In an N×N partition, PU 0 is at the upper left of the CU, PU 1 is at the upper right of the CU, PU 2 is at the lower left of the CU, and PU 3 is a the lower right of the CU.

FIG. 2 shows additional types of "non-square" partitions. A 2N×nD partition is a horizontally oriented non-square partition type, where the lower PU (PU 1) is of a smaller size (i.e. a quarter size of the CU size) than the upper PU (PU 0). A 2N×nU partition is a horizontally oriented non-square partition type, where the lower PU (PU 1) is of a larger size (i.e. three quarters of the CU size) than the upper PU (PU 0). An nL×2N partition is a vertically oriented non-square partition type, where the left PU (PU 0) is of a smaller size (i.e. a quarter size of the CU size) than the right PU (PU 1). An nR×2N partition is a vertically oriented non-square partition type, where the left PU (PU 0) is of a larger size (i.e., three quarters of the CU size) than the right PU (PU 1). These partitioning examples are sometimes called an asymmetric motion partition (AMP).

CUs are partitioned according to one of the partition types to provide for more accurate inter prediction (temporal prediction). Motion information is signaled separately for each partition. With a finer partition (e.g., a 2N×N partition is finer than a 2N×2N partition), a better quality of predictor can potentially be derived for each partition. On the other hand, since motion information is signaled separately for each partition, signaling overhead of a CU with a finer partition is also relatively higher. In practice, determining a partition type for a current CU is often based on rate-distortion optimization. The selected partition type is a tradeoff between accuracy of prediction and signaling overhead. Current proposals for the HEVC standard implement techniques to avoid using redundant merge candidates for PUs of the same CU. A redundant merge candidate is a merge candidate that has the same motion information as another PU in the same CU. For a particular partition type, each of the merge candidates for PU 1 (or PUs 1, 2 and 3 for an N×N partition) are compared with the motion information of PU 0 (or PUs 0, 1 and 2 for an N×N partition) to avoid the whole CU using the same motion information. If every PU in a CU used the same motion information, the result would be duplicative of the 2N×2N partition type (i.e., no partitioning). Thus the advantage of partitioning a CU for more accurate inter prediction would be negated.

In order to avoid using redundant merge candidates, one proposal for HEVC proposes comparing the motion information for each merge candidate in a merge candidate set with the motion information of other PUs of the same CU. Any merge candidates with the same motion information as a previously coded PU is removed from the merge candidate set to avoid the whole CU using same motion information.

According to this technique, the process for generating a merge candidate set for a PU is as follows:
1. Check the motion information for the next candidate block
2. Compare the candidate motion information with the motion information for previously coded PUs in the same CU
3. If the candidate motion information for the candidate block is the same as the motion information for a previously coded PU, go to step 1; otherwise, go to step 4
4. Add the candidate block into the merge candidate set
5. If all the candidate blocks are checked, finish; otherwise, go to step 1

In general, the restriction on merge candidates with this process produces the following results for 2N×N, N×2N and N×N partition types:
1) 2N×N/N×2N cases: if a merge candidate for the second PU (PU 1) has the same motion information as that of the first PU (PU 0), that merge candidate will be set as not available.
2) N×N case:

a. PU 0 and PU 1 have the same motion information. If a merge candidate of PU 3 has the same motion information as PU 2, the merge candidate is set to unavailable;

b. PU 0 and PU 2 have the same motion information. If a merge candidate of PU 3 has the same motion information as PU 1, the merge candidate is set to unavailable.

While this process does eliminate redundant merge candidates, this process requires that all PUs have been encoded/decoded prior to developing the merge candidate set for subsequent PUs. As such, the ability to process multiple PUs of one CU in parallel is limited. The encoder/decoder must determine the final motion information of all previous PUs in the same CU before constructing the merge candidate set for a current PU. Furthermore, the comparison operation for each candidate block may increase the computational complexity for the encoder/decoder.

In one example, this disclosure proposes to remove the comparison checking operation during generation of a merge candidate set, thus making merge candidate generation parallelization friendly. The disclosed technique eliminates the need for comparing motion information between candidate blocks and other PUs of a CU. As such, the merge candidate sets for all PUs of a CU may be generated in parallel. The disclosed process may also reduce the computational complexity of encoding and decoding.

The proposed process for each PU is
1. Check next candidate block
2. Add the candidate block into the candidate set
3. If all the neighboring blocks are checked, finish; otherwise, go to step 1

This process provides a unified solution for all PUs without considering the prediction unit's index (e.g., PU 0, PU 1) and without making a comparison of the motion information of the candidate block to the motion information of previously coded PUs. The motion information comparison steps illustrated above can be removed. Although described iteratively, the steps of this method can be performed in parallel. For example, a first thread of a parallel process can include instructions to perform a first instance of steps 1 and 2, and a second, different thread of the parallel process can include instructions to perform a second instance of steps 1 and 2. Additional threads can also be provided.

Based on the proposed technique, a merge candidate that is inside a previous PU can be included into the merge candidate set. However this may cause the whole CU to use the same motion information. As such, a partitioned CU may end up with the same coded motion vectors as a 2N×2N partition, and the benefits of partitioning for inter-prediction may be limited. In addition, including such redundant candidate blocks in the merge candidate set may cause some performance drops because extra bits are used to signal the redundant merge candidates. As such, this disclosure also proposes to remove merge candidates from the merge candidate set if the merge candidate is located inside another PU of the same CU.

Figure 3A:
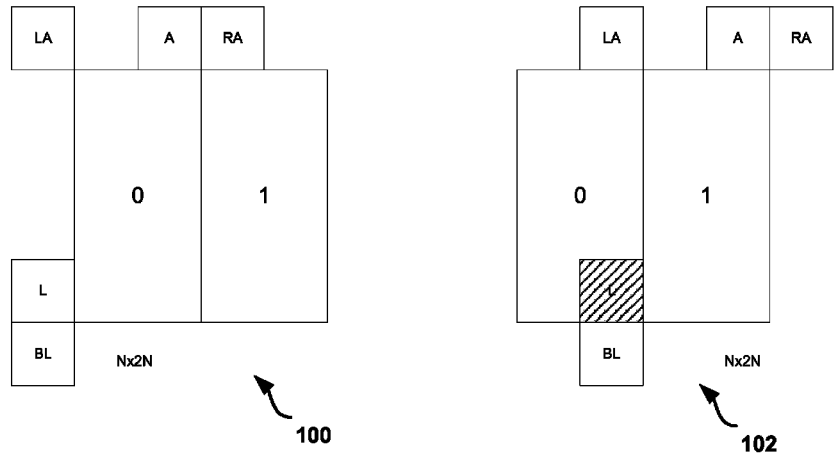
FIG. 3A is a conceptual diagram illustrating candidate blocks for merge mode motion vector prediction for an N×2N partition of a coding unit.

FIG. 3A is a conceptual diagram illustrating candidate blocks for merge mode for an N×2N partition of a CU. Note that the techniques shown in FIG. 3A are equally applicable for nL×2N or nR×2N asymmetric partition types. Merge candidate set 100 shows the merge candidates for PU 0 of an N×2N partitioned CU. Since no merge candidate in merge candidate set 100 is within another PU of the same CU, all merge candidates may remain in the merge candidate set 100. Merge candidate set 102 shows the merge candidates for PU 1 of an N×2N partitioned CU. As can be seen for merge set 102 for PU 1, merge candidate L is from PU 0 of the same CU. As such, merge candidate L may be removed/excluded from merge candidate set 102. In this context, a removed merge candidate may be thought of a candidate that is removed from a pre-defined list of merge candidates. An excluded merge candidate may be a merge candidate that is excluded from a merge candidate list as the merge candidate list is being derived, whether or not such list is pre-defined. In general, a removed/excluded merge candidate is any merge candidate that is not used in a final merge candidate list.

It should be noted that merge candidate L need not be located in the exact position in PU 0 (e.g., in the case that PU 0 is further partitioned), but may be excluded if merge candidate L is located in any portion of PU 0. Note, also, that each of merge candidate sets 100 and 102 also have the temporal merge candidate T, as shown in FIG. 1.

Figure 3B:
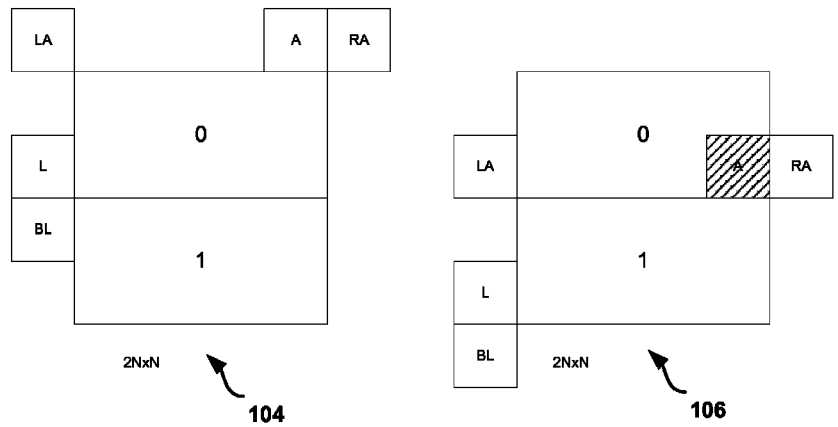
FIG. 3B is a conceptual diagram illustrating candidate blocks for merge mode motion vector prediction for a 2N×N partition of a coding unit.

FIG. 3B is a conceptual diagram illustrating candidate blocks for merge mode for a 2N×N partition of a CU. Note that the techniques shown in FIG. 3B are equally applicable for 2N×nU or 2N×nD asymmetric partition types. Merge candidate set 104 shows the merge candidates for PU 0 of a 2N×N partitioned CU. Since no merge candidate in merge candidate set 104 is within another PU of the same CU, all merge candidates may remain in the merge candidate set 104. Merge candidate set 106 shows the merge candidates for PU 1 of a 2N×N partitioned CU. As can be seen for merge set 106 for PU 1, merge candidate A is from PU 0 of the same CU. As such, merge candidate A may be removed/excluded from merge candidate set 106. It should be noted that merge candidate A need not be located in the exact position in PU 0 as shown (e.g., in the case that PU 0 is further partitioned), but may be excluded if merge candidate A is located in any portion of PU 0. Note, also, that each of merge candidate sets 104 and 106 also have the temporal merge candidate T, as shown in FIG. 1.

Figure 4A:
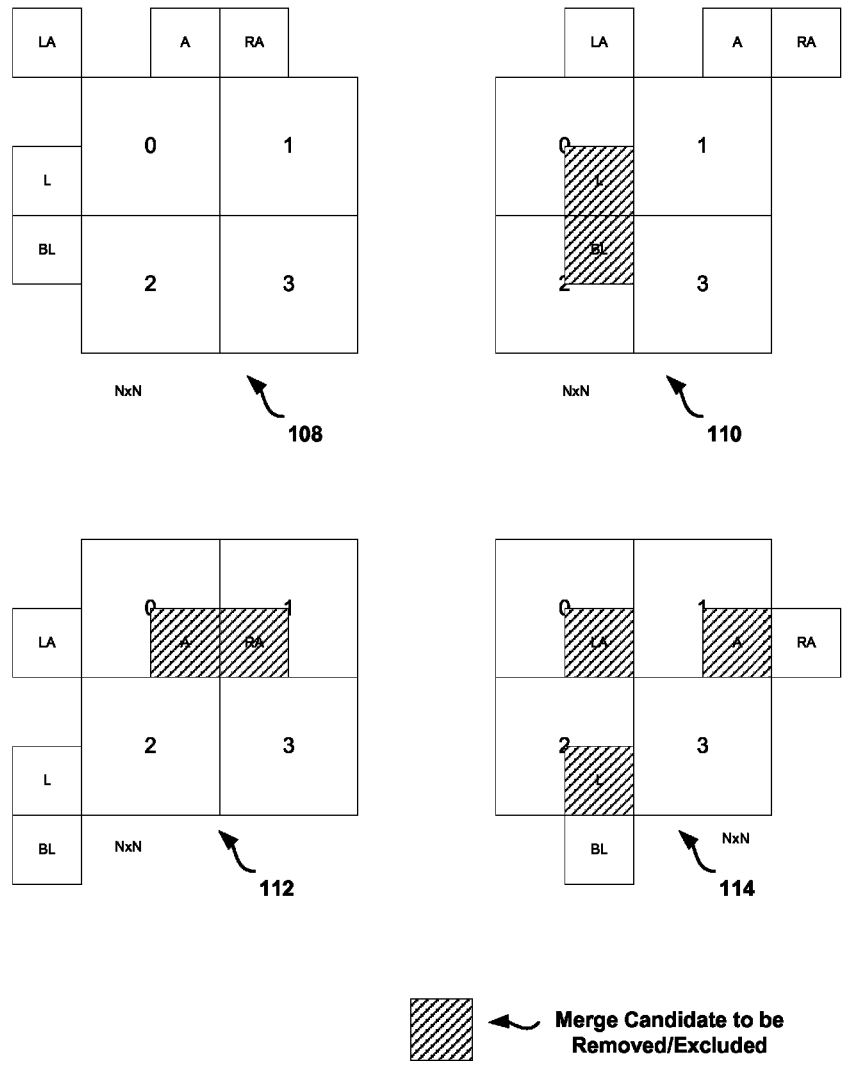
FIG. 4A is a conceptual diagram illustrating candidate blocks for merge mode motion vector prediction for an N×N partition of a coding unit.

FIG. 4A is a conceptual diagram illustrating candidate blocks for merge mode for an N×N partition of a CU. Merge candidate set 108 shows the merge candidates for PU 0 of an N×N partitioned CU. Since no merge candidate in merge candidate set 108 is within another PU of the same CU, all merge candidates may remain in the merge candidate set 108.

Merge candidate set 110 shows the merge candidates for PU 1 of an N×N partitioned CU. As can be seen for merge set 110 for PU 1, merge candidates L and BL are from PU 0 and PU 2, respectively, of the same CU. As such, merge candidates L and BL may be removed/excluded from merge candidate set 110. It should be noted that merge candidates L and BL need not be located in the exact position in PU 0 and PU 2 as shown (e.g., in the case that PU 0 or PU 2 are further partitioned), but may be excluded if merge candidates L and/or BL are located in any portion of PU 0 and/or PU 2.

Merge candidate set 112 shows the merge candidates for PU 2 of an N×N partitioned CU. As can be seen for merge set 112 for PU 2, merge candidates A and RA are from PU 0 and PU 1, respectively, of the same CU. As such, merge candidates A and RA may be removed/excluded from merge candidate set 112. It should be noted that merge candidates A and RA need not be located in the exact position in PU 0 and PU 1 as shown (e.g., in the case that PU 0 or PU 1 are further partitioned), but may be excluded if merge candidates A and/or RA are located in any portion of PU 0 and/or PU 1.

Merge candidate set 114 shows the merge candidates for PU 3 of an N×N partitioned CU. As can be seen for merge set 114 for PU 3, merge candidates LA, A and L are from PU 0, PU 1 and PU 2 respectively, of the same CU. As such, merge candidates LA, A and L may be removed/excluded from merge candidate set 114. It should be noted that merge candidates LA, A and L need not be located in the exact position in PU 0, PU 1 and PU 2 as shown (e.g., in the case that PU 0, PU 1 or PU 2 are further partitioned), but may be excluded if merge candidates LA, A and/or L are located in any portion of PU 0, PU 1 and/or PU 2.

Note, that each of merge candidate sets 108, 110, 112 and 114 also have the temporal merge candidate T, as shown in FIG. 1.

Although the examples described above consider only the 2N×N, N×2N, and N×N partition types, other partition types (e.g. AMP, geometric motion partition (GMP), etc.) can also benefit from the disclosed techniques. In general, the proposed techniques determine a merge candidate set without comparing the motion information of the merge candidates with the motion information of any other prediction units. Furthermore, merge candidates within the merge candidate set for a current prediction unit may be removed/excluded if they are within another prediction unit of the same coding unit.

Figure 4B:
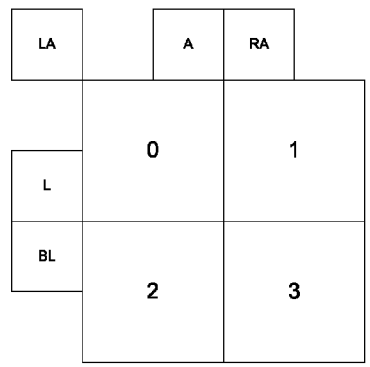
FIG. 4B is a conceptual diagram illustrating another example of candidate blocks for merge mode motion vector prediction for an N×N partition of a coding unit.
Figure 4B:
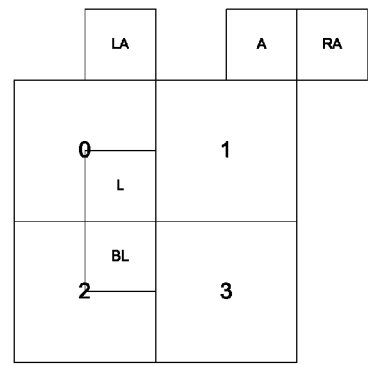
Figure 4B:
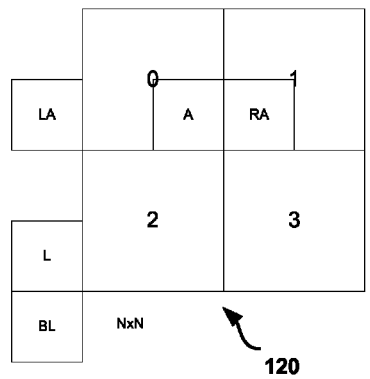
Figure 4B:
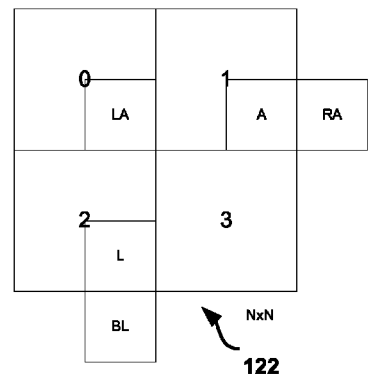

In another example, for the N×N partition mode, all merge candidates of each prediction unit are used regardless of any use by another prediction unit. FIG. 4B is a conceptual diagram illustrating example candidate blocks for merge mode for an N×N partition of a coding unit where no merge candidates are removed/excluded, regardless of their position in another PU. As shown in FIG. 4B, all candidates (including temporal candidate T), are used for each of PUs 116, 118, 120 and 122. For other partition modes, such as 2N×N, N×2N, and asymmetric modes such as 2N×nD, 2N×nU, nL×2N and nR×2N, exclusion of a certain candidates for a current PU that are located inside another PU of the same CU is applied according to the process described above.

In another example of the disclosure, a merge candidate set is generate that utilizes all potential merge candidates in the set shown in FIG. 1 for prediction unit 1 in the N×2N and 2N×N partition modes, in the case prediction unit 0 in the particular partition mode uses a merge candidate (i.e., the actually selected candidate in the motion vector prediction) that is not duplicative of a merge candidate that would be used in the 2N×2N partition mode. In another example, for the N×N partition mode, all merge candidates are used regardless of any use by another prediction unit.

The rules for generating a merge candidate set according to this example are as follows:
1. N×2N partition mode: The left (L) merge candidate of PU 1 is used if the merge index (i.e., the actually selected merged candidate) used for PU 0 is RA, A or T; otherwise L is not used (contrasted with the previous example of the disclosure, where L is never used for PU 1)
2. 2N×N partition mode: The above (A) merge candidate of PU 1 is used if the merge index used for PU 0 is BL, L or T; otherwise A is not used (contrasted with the previous example of the disclosure, where A is never used for PU 1).
3. N×N partition mode: All prediction candidates of all PUs are considered as valid In the N×2N example, utilizing merge candidate L for PU 1 does not become duplicative of the 2N×2N partition mode, because merge candidate locations RA, A or T for PU 0 in the N×2N partition mode would not necessarily be used for the 2N×2N partition. Likewise, in the 2N×N example, utilizing merge candidate A for PU 1 does not become duplicative of the 2N×2N partition mode, because merge candidates BL, L or T for PU 0 would not necessarily be used for the 2N×2N partition.

Figure 5:
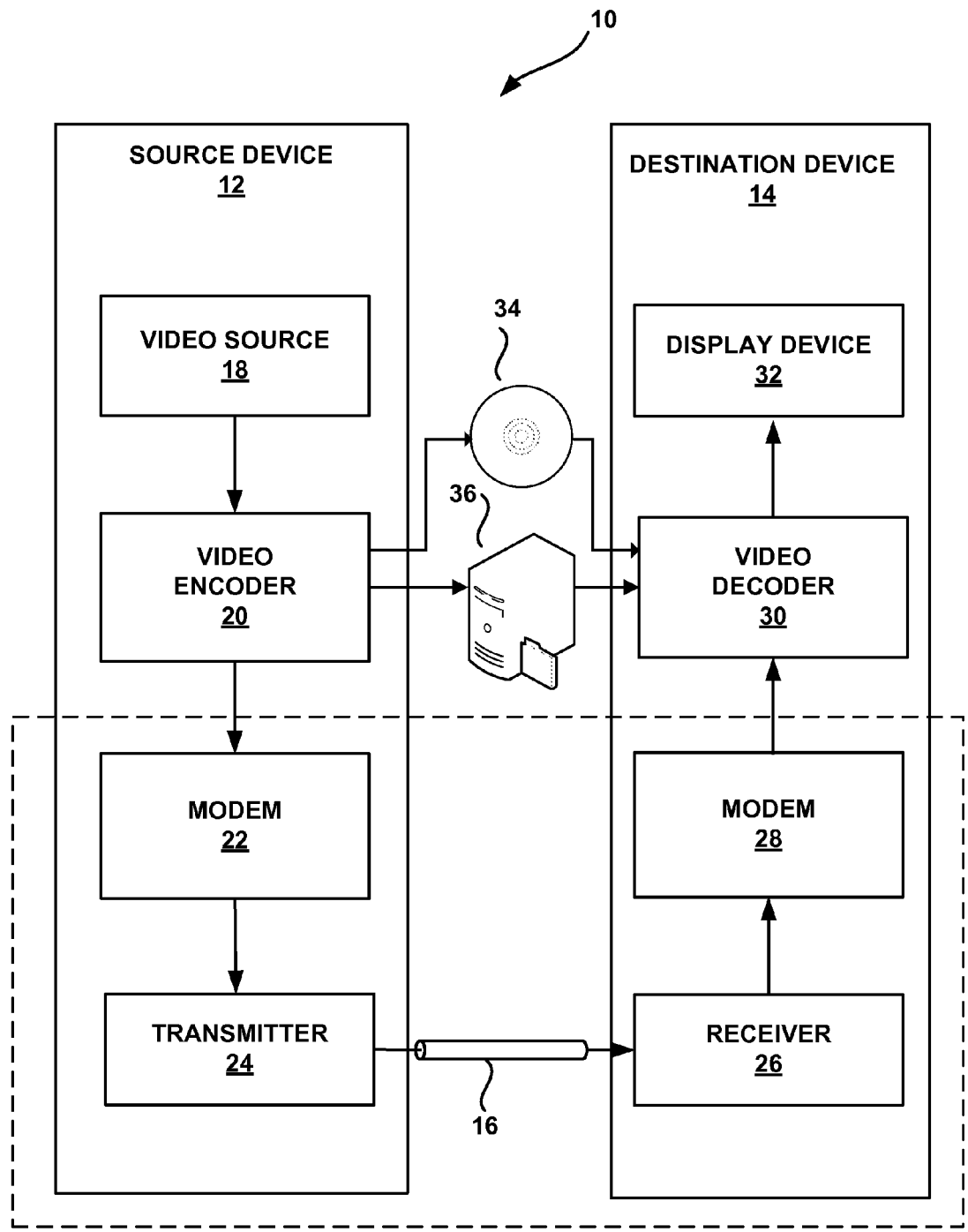
FIG. 5 is a block diagram illustrating an example video coding system.

FIG. 5 is a block diagram illustrating an example video encoding and decoding system 10 that may be configured to utilize techniques for generating candidate motion vectors in a merge mode in accordance with examples of this disclosure. As shown in FIG. 5, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including mobile devices, desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for generating candidate motion vectors in a merge mode, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 5, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 5, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 5, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 5, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for generating candidate motion vectors in a merge mode in a video encoding process. Likewise, the video decoder 30 may implement any or all of these techniques for generating candidate motion vectors in a merge mode in a video decoding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, the video encoder 20 of the source device 12 may be configured to determine a merge candidate set for a current prediction unit of a current coding unit, wherein the merge candidate set is determined without comparing motion information of a merge candidate in the merge candidate set to motion information of any other prediction units, and to perform a merge motion vector prediction process for the current prediction unit using the merge candidate set. The video encoder 20 may be further configured to remove merge candidates from the merge candidate set that are within another prediction unit of the current coding unit.

In another example of the disclosure, the video decoder 30 of the source device 12 may be configured to determine a merge candidate set for a current prediction unit of a current coding unit, wherein the merge candidate set is determined without comparing motion information of a merge candidate in the merge candidate set to motion information of any other prediction units, and to perform a merge motion vector prediction process for the current prediction unit using the merge candidate set. The video decoder 30 may be further configured to remove merge candidates from the merge candidate set that are within another prediction unit of the current coding unit.

Figure 6:
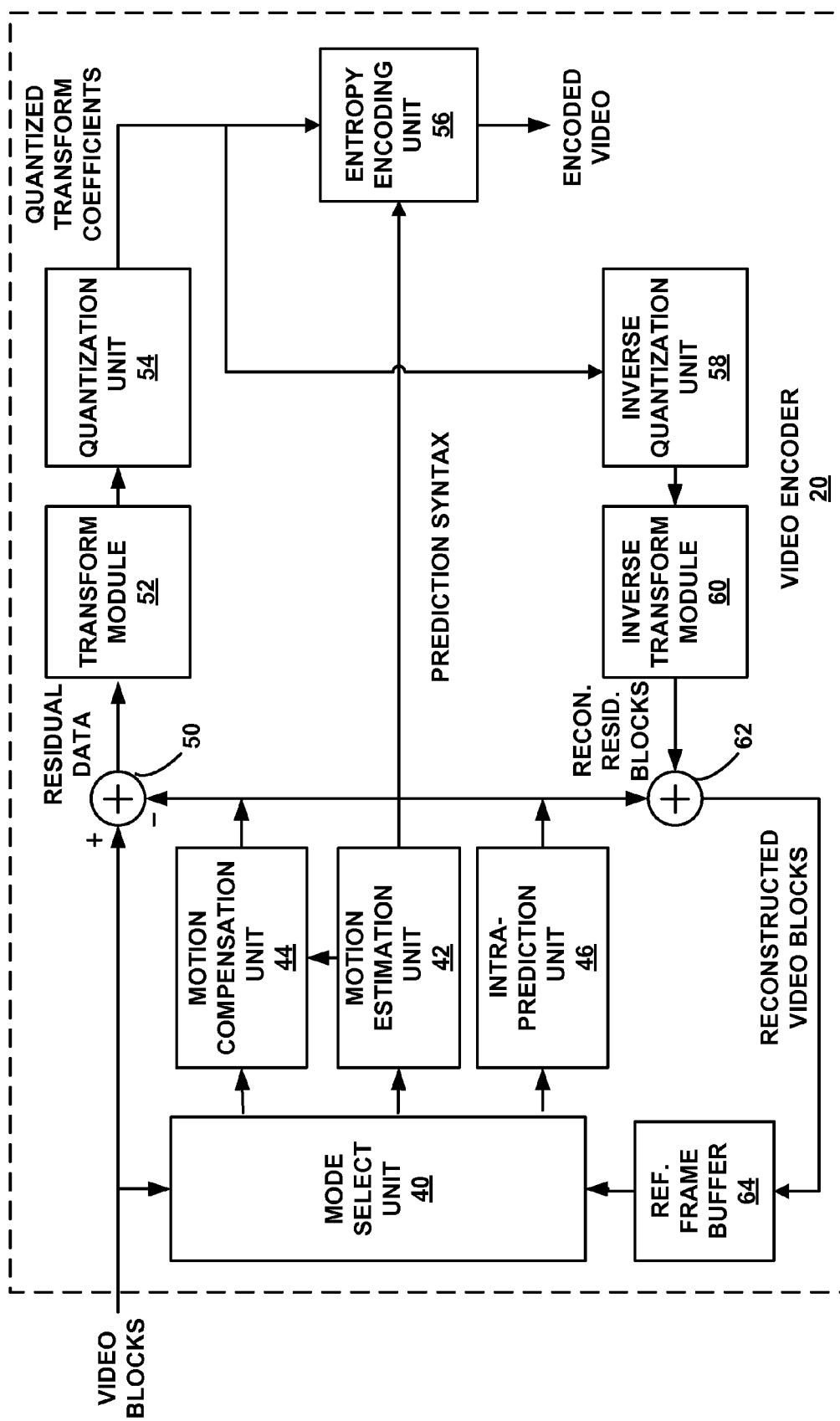
FIG. 6 is a block diagram illustrating an example video encoder.

FIG. 6 is a block diagram illustrating an example of a video encoder 20 that may use techniques for generating candidate motion vectors in a merge mode as described in this disclosure. The video encoder 20 will be described in the context of HEVC coding for purposes of illustration, but without limitation of this disclosure as to other coding standards or methods.

The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 6, the video encoder 20 receives a current video block within a video frame to be encoded. In the example of FIG. 6, the video encoder 20 includes a motion compensation unit 44, a motion estimation unit 42, an intra-prediction unit 46, a reference frame buffer 64, a summer 50, a transform module 52, a quantization unit 54, and an entropy encoding unit 56. The transform module 52 illustrated in FIG. 6 is the structure or apparatus that applies the actual transform or combinations of transform to a block of residual data, and is not to be confused with block of transform coefficients, which may be referred to as a transform unit (TU) of a CU. For video block reconstruction, the video encoder 20 also includes an inverse quantization unit 58, an inverse transform module 60, and a summer 62. A deblocking filter (not shown in FIG. 6) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform module 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice.

The portion of the reference frame identified by a motion vector may be referred to as a reference sample. The motion compensation unit 44 may calculate a prediction value for a prediction unit of a current CU, e.g., by retrieving the reference sample identified by a motion vector for the PU. In some video encoding techniques, the motion estimation unit 42 sends the calculated motion vector, reference frame, and prediction direction (e.g., the direction in terms of whether the reference frame temporally precedes or follows the current frame) to the entropy encoding unit 56 and the motion compensation unit 44. Other video encoding techniques utilize a motion vector prediction process to encode the motion vector. The motion vector prediction process may be chosen from among a plurality of modes, including a merge mode.

In merge mode, the encoder considers a set of merge candidate blocks and selects a block that has the same (or most closely matches) motion vector, reference frame, and prediction direction as the current block to be coded. This is accomplished, for example, by checking each candidate block in turn and choosing the one that yields the best rate-distortion performance once its motion vector, reference frame, and prediction direction are copied to the current block. Then, rather than signaling this motion vector information (i.e., the motion vector, reference frame, and prediction direction) in the encoded video bitstream, the encoder signals an index number for the selected motion vector candidate. The index number identifies the selected candidate motion vector among a set of candidate motion vectors. A decoder may copy the motion vector information from the motion vector candidate to use for a current block.

In the examples described above, signaling the motion vector information in the encoded bitstream does not necessarily require real-time transmission of such elements from the encoder to a decoder, but rather means that such information is encoded into the bitstream and are made accessible to the decoder in any fashion. This may include real-time transmission (e.g., in video conferencing) as well as storing the encoded bitstream on a computer-readable medium for future use by a decoder (e.g., in streaming, downloading, disk access, card access, DVD, Blu-ray, etc.).

In accordance with examples of this disclosure described above, for merge mode, a merge candidate set may be generated without comparing the motion information of any merge candidates with the motion information of other PUs within the same CU as the current PU. In addition, this disclosure also proposes to remove merge candidates from the merge candidate set if the merge candidate is located inside another PU of the same CU. The generation of merge candidates may be handled by motion compensation unit 44, motion compensation unit 42, or by any other fixed function or programmable hardware structure of video encoder 20.

As one example, for an N×2N partition of a CU, all merge candidates (e.g., the merge candidates shown in FIG. 1) may be used for PU 0. For PU 1, merge candidate L is removed/excluded from the merge candidate list (see FIG. 3A) as it is within PU 0. As another example, for a 2N×N partition of a CU, all merge candidates (e.g., the merge candidate shown in FIG. 1) may be used for PU 0. For PU 1, merge candidate A is removed from the merge candidate list (see FIG. 3B) as it is within PU 0.

As another example, for an N×N partition of a CU, all merge candidates (e.g., the merge candidates shown in FIG. 1) may be used for PU 0. For PU 1, merge candidates L and BL are removed/excluded from the merge candidate list (see FIG. 4A) as they are within PU 0 and PU 2, respectively. For PU 2, merge candidates A and RA are removed/excluded from the merge candidate list (see FIG. 4A) as they are within PU 0 and PU 1, respectively. For PU 3, merge candidates LA, A and L are removed/excluded from the merge candidate list (see FIG. 4A) as they are within PU 0, PU 1 and PU 2, respectively. As such, PU 0 may use merge candidates BL, L, LA, A, RA and T. PU 1 may use merge candidates LA, A, RA and T. PU 2 may use merge candidates BL, L, LA and T. PU 3 may use merge candidates BL, RA and T.

As yet another example, for the N×N partition mode, all merge candidates of each prediction unit are used regardless of any use by another prediction unit (see FIG. 4B). For other partition modes, such as 2N×N, N×2N and asymmetric modes such as 2N×nD, 2N×nU, nL×2N and nR×2N, exclusion of a certain candidates for a current PU that are located inside another PU of the same CU is applied according to the process described above.

Returning to FIG. 6, the intra-prediction unit 46 may perform intra-prediction on the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-four directional prediction modes, based on the size of the CU being encoded.

The intra-prediction unit 46 may select an intra-prediction mode by, for example, calculating prediction error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the calculated or predicted values of the PU and the received original block to be encoded. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block, which may include one luma block and two chroma blocks, by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. Such an operation is applied to both luma and chroma components, so the differences may be chroma or luma differences depending on the type of block that is coded.

The transform module 52 may form one or more transform units (TUs) from the residual block. The transform module 52 selects a transform from among a plurality of transforms. The transform may be selected based on one or more coding characteristics, such as block size, coding mode, or the like. The transform module 52 then applies the selected transform to the TU, producing a video block comprising a two-dimensional array of transform coefficients.

The transform module 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as context adaptive variable length coding (CAVLC), context adaptive binary arithmetic coding (CABAC), syntax-based context-adaptive binary arithmetic coding (SBAC), or another entropy coding methodology to the coefficients. Entropy coding may also be applied to syntax elements, such as syntax elements used in merge mode.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. In the case of transform coefficients, the context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform module 60 apply inverse quantization and inverse transformation, respectively, to reconstruct the residual block in the pixel domain, e.g., for later use in reconstructing a reference block. The motion compensation unit 44 may calculate a reference block by adding the residual block to a predictive block formed from one of the frames of the reference frame buffer 64, which may also be referred to as a decoded picture buffer. The motion compensation unit 44 may also apply one or more interpolation filters to the reconstructed reference block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in another, subsequently coded video frame.

Figure 7:
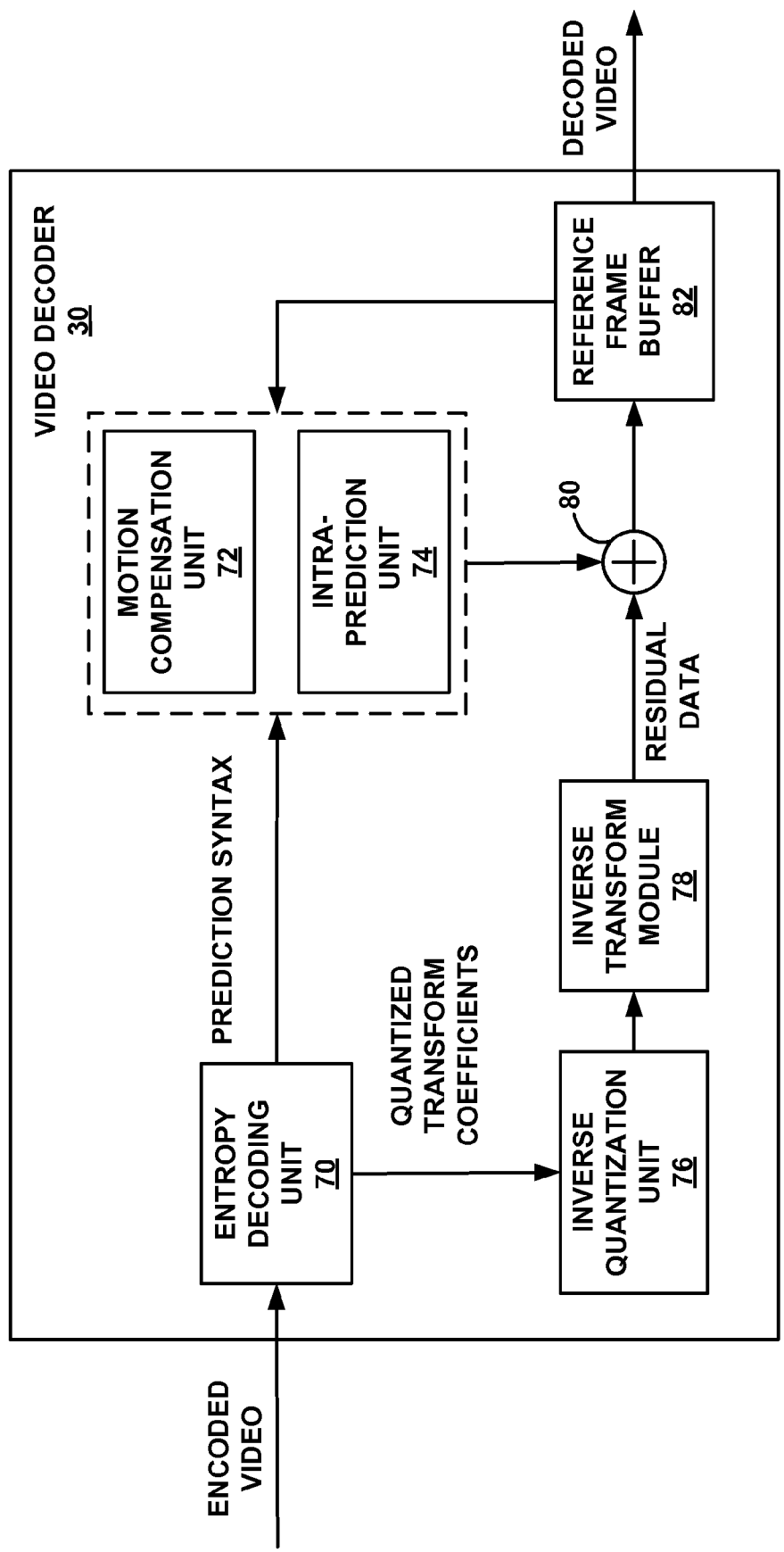
FIG. 7 is a block diagram illustrating an example video decoder.

FIG. 7 is a block diagram illustrating an example of a video decoder 30, which decodes an encoded video sequence. In the example of FIG. 7, the video decoder 30 includes an entropy decoding unit 70, a motion compensation unit 72, an intra-prediction unit 74, an inverse quantization unit 76, an inverse transform module 78, a reference frame buffer 82 and a summer 80. The video decoder 30 may, in some examples, perform a decoding pass generally reciprocal to the encoding pass described with respect to the video encoder 20 (see FIG. 6).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients alternatively may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform module 78 applies an inverse transform to the inverse quantized transform coefficients. In some examples, the inverse transform module 78 may determine an inverse transform based on signaling from the video encoder 20, or by inferring the transform from one or more coding characteristics such as block size, coding mode, or the like. In some examples, the inverse transform module 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform module 78 may apply a cascaded inverse transform, in which inverse transform module 78 applies two or more inverse transforms to the transform coefficients of the current block being decoded.

The intra-prediction unit 74 may generate prediction data for a current block of a current frame based on a signaled intra-prediction mode and data from previously decoded blocks of the current frame.

According to examples of this disclosure, the video decoder 30 may receive, from the encoded bitstream, prediction syntax that indicates an index of a selected merge candidate block from a set of merge candidate blocks for use in a motion vector prediction process. The video decoder is further configured to retrieve a motion vector, a reference frame, and a prediction direction associated with the merge candidate block identified by the received index, and to perform inter-prediction decoding for the current block using the retrieved motion vector, reference frame, and prediction direction.

In accordance with examples of this disclosure described above, for merge mode, a merge candidate set may be generated by video decoder 30 without comparing the motion information of any merge candidates with the motion information of other PUs within the same CU as the current PU. In addition, this disclosure also proposes to remove merge candidates from the merge candidate set if the merge candidate is located inside another PU of the same CU. The generation of merge candidates may be handled by motion compensation unit 72 or by any other fixed function or programmable hardware structure of video decoder 30. Once video decoder 30 has determined the final merge candidate set, it may retrieve the motion information from the merge candidate indicated by the received index.

As one example, for an N×2N partition of a CU, all merge candidates (e.g., the merge candidates shown in FIG. 1) may be used for PU 0. For PU 1, merge candidate L is removed/excluded from the merge candidate list (see FIG. 3A) as it is within PU 0. As another example, for a 2N×N partition of a CU, all merge candidates (e.g., the merge candidate shown in FIG. 1) may be used for PU 0. For PU 1, merge candidate A is removed/excluded from the merge candidate list (see FIG. 3B) as it is within PU 0.

As another example, for an N×N partition of a CU, all merge candidates (e.g., the merge candidates shown in FIG. 1 may be used for PU 0. For PU 1, merge candidates L and BL are removed/excluded from the merge candidate list (see FIG. 4A) as they are within PU 0 and PU 2, respectively. For PU 2, merge candidates A and RA are removed/excluded from the merge candidate list (see FIG. 4A) as they are within PU 0 and PU 1, respectively. For PU 3, merge candidates LA, A and L are removed/excluded from the merge candidate list (see FIG. 4A) as they are within PU 0, PU 1 and PU 2, respectively.

As yet another example, for the N×N partition mode, all merge candidates of each prediction unit are used regardless of any use by another prediction unit (see FIG. 4B). For other partition modes, such as 2N×N, N×2N and asymmetric modes such as 2N×nD, 2N×nU, nL×2N and nR×2N, exclusion of a certain candidates for a current PU that are located inside PU of the same CU is applied according to the process described above.

Returning to FIG. 7, the motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction unit 74, in an HEVC example, may use some of the syntax information (e.g., provided by a quadtree) to determine sizes of LCUs used to encode frame(s) of the encoded video sequence. The motion compensation unit 72 and the intra-prediction unit 74 may also use syntax information to determine split information that describes how each CU of a frame of the encoded video sequence is split (and likewise, how sub-CUs are split). The syntax information may also include modes indicating how each CU is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. The decoded blocks, in effect, reconstruct the originally coded blocks, subject to loss due to quantization or other coding aspects. If desired, a deblocking filter may also be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 5).

Figure 8:
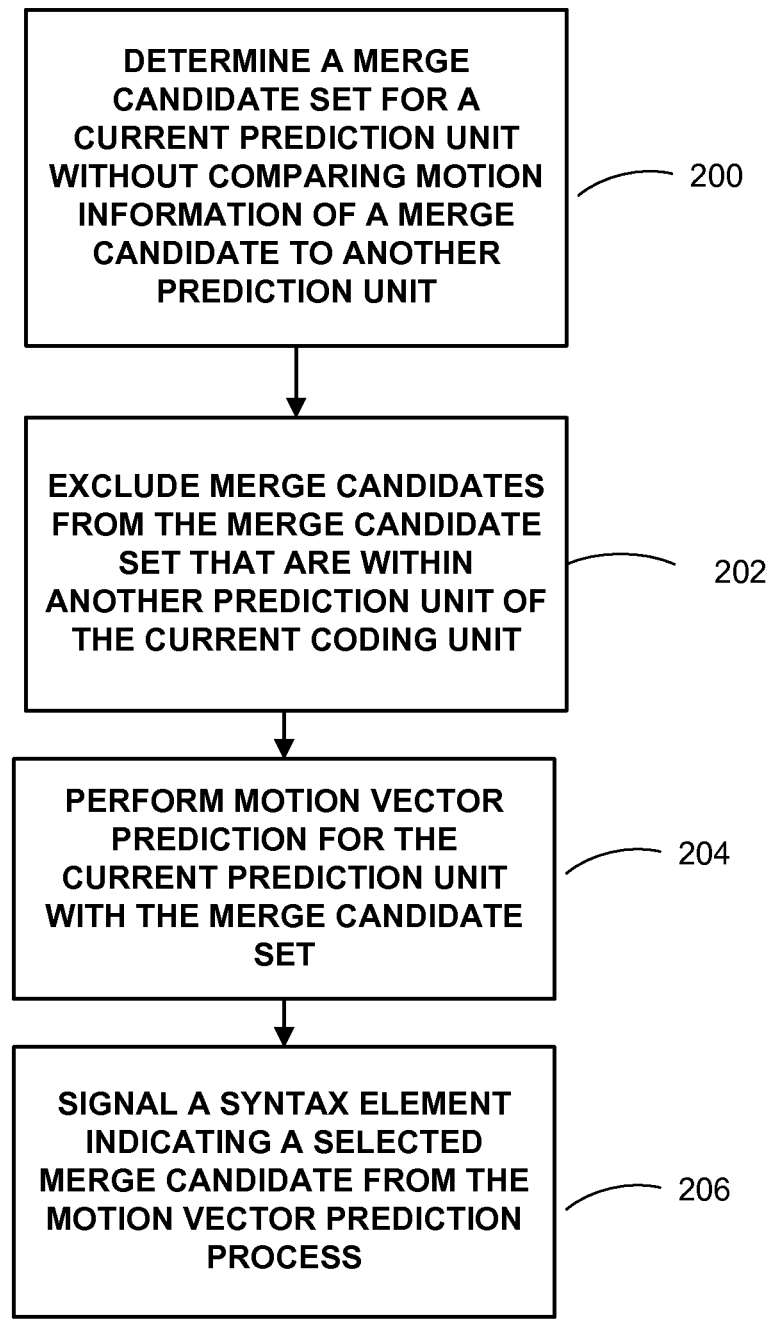
FIG. 8 is a flowchart illustrating an example method of encoding video according to the techniques of this disclosure.

FIG. 8 is a flowchart illustrating an example method of encoding video according to the techniques of this disclosure. The method of FIG. 8 may be carried out by video encoder 20 of FIG. 6. Video encoder 20 may be configured to determine a merge candidate set for a current prediction unit of a current coding unit, wherein the merge candidate set is determined without comparing motion information of a merge candidate in the merge candidate set to motion information of another prediction unit (200), and remove merge candidates from the merge candidate set that are within another prediction unit of the current coding unit (202). The merge candidate set may include a left above merge candidate, an above merge candidate, a right above merge candidate, a left merge candidate, a below left merge candidate, and a temporal merge candidate.

In the case that the current coding unit has a 2N×N partition type, including a prediction unit 0 positioned above a prediction unit 1, video encoder 20 may remove the above merge candidate from the merge candidate set for prediction unit 1. In the case that the current coding unit has an N×2N partition type including a prediction unit 0 positioned to the left of a prediction unit 1, video encoder 20 may remove the left merge candidate from the merge candidate set for prediction unit 1.

In the case that the current coding unit has an N×N partition type, including a prediction unit 0 positioned in a top left portion of the current coding unit, a prediction unit 1 positioned in a top right portion of the current coding unit, a prediction unit 2 positioned in a bottom left portion of the current coding unit, and a prediction unit 3 positioned in a bottom right portion of the current coding unit, video encoder 20 may remove the left merge candidate and the below left merge candidate from the merge candidate set for prediction unit 1. In this case, video encoder 20 may further remove the above merge candidate and the right above merge candidate from the merge candidate set for prediction unit 2. Video encoder 20, in this case, may still further remove the above merge candidate, the left merge candidate, and the left above merge candidate from the merge candidate set for prediction unit 3.

In other examples, excluding merge candidates comprises excluding merge candidates from the merge candidate set that are within another prediction unit for the current coding unit for all partition modes other than an N×N partition mode. In this case, no merge candidates are removed/excluded from prediction units from the coding unit having the N×N partition mode.

Video encoder 20 may be further configured to perform a merge motion vector prediction process for the current prediction unit using the merge candidate set to determine a selected merge candidate for the current prediction unit (204), and signal a syntax element indicating the selected merge candidate in an encoded video bitstream (206).

Figure 9:
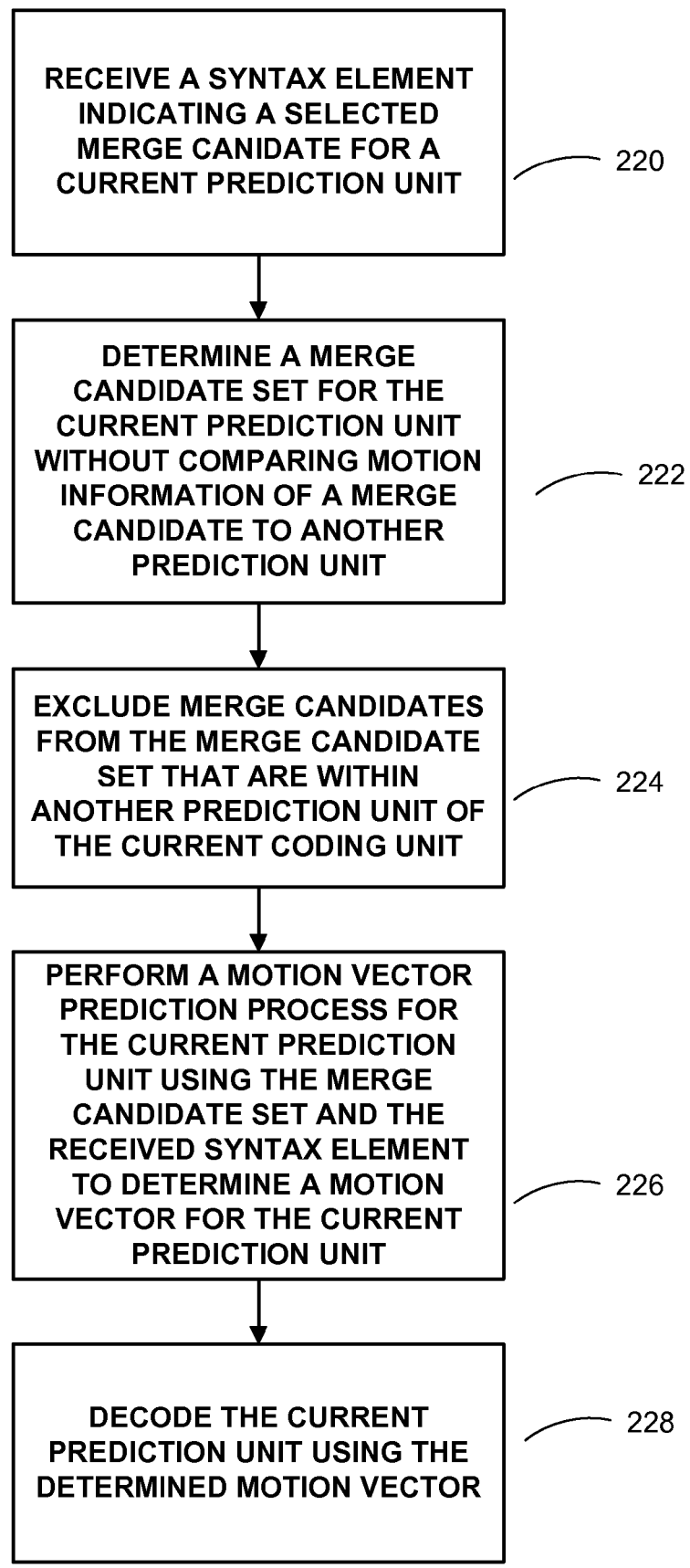
FIG. 9 is a flowchart illustrating an example method of decoding video according to the techniques of this disclosure.

FIG. 9 is a flowchart illustrating an example method of decoding video according to the techniques of this disclosure. The methods of FIG. 9 may be carried about by video decoder 30 of FIG. 7. Video decoder 30 may be configured to receive a syntax element indicating a selected merge candidate for a current prediction unit (220), and determine a merge candidate set for the current prediction unit of a current coding unit, wherein the merge candidate set is determined without comparing motion information of a merge candidate in the merge candidate set to motion information of any other prediction units (222). Video decoder 30 may be further configured to remove merge candidates from the merge candidate set that are within another prediction unit of the current coding unit (224). The merge candidate set may include a left above merge candidate, an above merge candidate, a right above merge candidate, a left merge candidate, a below left merge candidate, and a temporal merge candidate.

In the case that the current coding unit has a 2N×N partition type, including a prediction unit 0 positioned above a prediction unit 1, video decoder 30 may remove the above merge candidate from the merge candidate set for prediction unit 1. In the case that the current coding unit has an N×2N partition type including a prediction unit 0 positioned to the left of a prediction unit 1, video decoder 30 may remove the left merge candidate from the merge candidate set for prediction unit 1.

In the case that the current coding unit has an N×N partition type, including a prediction unit 0 positioned in a top left portion of the current coding unit, a prediction unit 1 positioned in a top right portion of the current coding unit, a prediction unit 2 positioned in a bottom left portion of the current coding unit, and a prediction unit 3 positioned in a bottom right portion of the current coding unit, video decoder 30 may remove the left merge candidate and the below left merge candidate from the merge candidate set for prediction unit 1. In this case, video decoder 30 may further remove the above merge candidate and the right above merge candidate from the merge candidate set for prediction unit 2. Video decoder 30, in this case, may still further remove the above merge candidate, the left merge candidate, and the left above merge candidate from the merge candidate set for prediction unit 3.

In other examples, excluding merge candidates comprises excluding merge candidates from the merge candidate set that are within another prediction unit for the current coding unit for all partition modes other than an N×N partition mode. In this case, no merge candidates are removed/excluded from prediction units from the coding unit having the N×N partition mode.

Video decoder 30 may be further configured to perform a merge motion vector prediction process for the current prediction unit using the merge candidate set and the received syntax element to determine a motion vector for the current prediction unit (226), and decode the current prediction unit using the determined motion vector (228).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data comprising:
    determining a merge candidate set for a current non-square prediction unit of a current coding unit, wherein the merge candidate set includes a left above merge candidate, an above merge candidate, a right above merge candidate, a left merge candidate, a below left merge candidate, and a temporal merge candidate;
    removing, from the merge candidate set, merge candidates that are within another prediction unit of the current coding unit based on the spatial locations of the merge candidates without comparing motion information of a respective merge candidate in the merge candidate set to motion information of any other prediction units; and
    performing a merge motion vector prediction process for the current prediction unit using the merge candidate set.

2. The method of claim 1, wherein the current coding unit has a 2N×N, a 2N×nU or a 2N×nD partition type, including a prediction unit 0 positioned above a prediction unit 1, and wherein removing merge candidates from the merge candidate set comprises removing the above merge candidate from the merge candidate set for prediction unit 1.

3. The method of claim 1, wherein the current coding unit has an N×2N, an nL×2N or an nR×2N partition type, including a prediction unit 0 positioned to the left of a prediction unit 1, and wherein removing merge candidates from the merge candidate set comprises removing the left merge candidate from the merge candidate set for prediction unit 1.

4. The method of claim 1, wherein coding video comprises decoding video, and wherein the method further comprises:
    receiving a syntax element indicating a selected merge candidate for the current prediction unit;
    performing the merge motion vector prediction process for the current prediction unit using the merge candidate set and the received syntax element to determine a motion vector for the current prediction unit; and
    decoding the current prediction unit using the determined motion vector.

5. The method of claim 1, wherein coding video comprises encoding video, and wherein the method further comprises:
    performing the motion vector prediction process for the current prediction unit using the merge candidate set to determine a selected merge candidate for the current prediction unit; and
    signaling a syntax element indicating the selected merge candidate in an encoded video bitstream.

6. An apparatus configured to code video data comprising:
    a memory configured to store the video data; and
    a video coder configured to:

determine a merge candidate set for a current non-square prediction unit of a current coding unit of the video data, wherein the merge candidate set includes a left above merge candidate, an above merge candidate, a right above merge candidate, a left merge candidate, a below left merge candidate, and a temporal merge candidate;

remove, from the merge candidate set, merge candidates that are within another prediction unit of the current coding unit based on the spatial locations of the merge candidates without comparing motion information of a respective merge candidate in the merge candidate set to motion information of any other prediction units; and perform a merge motion vector prediction process for the current prediction unit using the merge candidate set.

7. The apparatus of claim 6, wherein the current coding unit has a 2N×N, a 2N×nU or a 2N×nD partition type, including a prediction unit 0 positioned above a prediction unit 1, and wherein the video coder is further configured to remove the above merge candidate from the merge candidate set for prediction unit 1.

8. The apparatus of claim 6, wherein the current coding unit has an N×2N, an nL×2N or an nR×2N partition type, including a prediction unit 0 positioned to the left of a prediction unit 1, and wherein the video coder is further configured to remove the left merge candidate from the merge candidate set for prediction unit 1.

9. The apparatus of claim 6, wherein the video coder is a video decoder, and wherein the video decoder is further configured to:

receive a syntax element indicating a selected merge candidate for the current prediction unit;

perform the merge motion vector prediction process for the current prediction unit using the merge candidate set and the received syntax element to determine a motion vector for the current prediction unit; and decode the current prediction unit using the determined motion vector.

10. The apparatus of claim 6, wherein the video coder is a video encoder, and wherein the video encoder is further configured to:

perform the motion vector prediction process for the current prediction unit using the merge candidate set to determine a selected merge candidate for the current prediction unit; and signal a syntax element indicating the selected merge candidate in an encoded video bitstream.

11. The apparatus of claim 6, wherein the video coder is part of a mobile device, and wherein the apparatus further comprises one or more of a camera configured to capture a picture that includes the current prediction unit or a display configured to display the picture that includes the current prediction unit.

12. An apparatus configured to code video data comprising:

means for determining a merge candidate set for a current non-square prediction unit of a current coding unit, wherein the merge candidate set includes a left above merge candidate, an above merge candidate, a right above merge candidate, a left merge candidate, a below left merge candidate, and a temporal merge candidate;

means for removing, from the merge candidate set, merge candidates that are within another prediction unit of the current coding unit based on the spatial locations of the merge candidates without comparing motion information of a respective merge candidate in the merge candidate set to motion information of any other prediction units; and means for performing a merge motion vector prediction process for the current prediction unit using the merge candidate set.

13. The apparatus of claim 12, wherein the current coding unit has a 2N×N, a 2N×nU or a 2N×nD partition type, including a prediction unit 0 positioned above a prediction unit 1, and wherein the means for removing merge candidates from the merge candidate set comprises means for removing the above merge candidate from the merge candidate set for prediction unit 1.

14. The apparatus of claim 12, wherein the current coding unit has an N×2N, an nL×2N or an nR×2N partition type, including a prediction unit 0 positioned to the left of a prediction unit 1, and wherein the means for removing merge candidates from the merge candidate set comprises means for removing the left merge candidate from the merge candidate set for prediction unit 1.

15. The apparatus of claim 12, wherein the apparatus is configured to decode video, and wherein the apparatus further comprises:

means for receiving a syntax element indicating a selected merge candidate for the current prediction unit;

means for performing the merge motion vector prediction process for the current prediction unit using the merge candidate set and the received syntax element to determine a motion vector for the current prediction unit; and means for decoding the current prediction unit using the determined motion vector.

16. The apparatus of claim 12, wherein the apparatus is configured to encode video, and wherein the apparatus further comprises:

means for performing the motion vector prediction process for the current prediction unit using the merge candidate set to determine a selected merge candidate for the current prediction unit; and means for signaling a syntax element indicating the selected merge candidate in an encoded video bitstream.

17. The apparatus of claim 12, wherein the apparatus is part of a mobile device.

18. A non-transitory computer-readable storage medium having stored thereon instructions that when executed cause one or more processors configured to code video data to:

determine a merge candidate set for a current non-square prediction unit of a current coding unit, wherein the merge candidate set includes a left above merge candidate, an above merge candidate, a right above merge candidate, a left merge candidate, a below left merge candidate, and a temporal merge candidate;

remove, from the merge candidate set, merge candidates that are within another prediction unit of the current coding unit based on the spatial locations of the merge candidates without comparing motion information of a respective merge candidate in the merge candidate set to motion information of any other prediction units; and perform a merge motion vector prediction process for the current prediction unit using the merge candidate set.

19. The non-transitory computer-readable storage medium of claim 18, wherein the current coding unit has a 2N×N, a 2N×nU or a 2N×nD partition type, including a prediction unit 0 positioned above a prediction unit 1, and wherein the instructions further cause the one or more processors to remove the above merge candidate from the merge candidate set for prediction unit 1.

20. The non-transitory computer-readable storage medium of claim 18, wherein the current coding unit has an N×2N, an nL×2N or an nR×2N partition type, including a prediction unit 0 positioned to the left of a prediction unit 1, and wherein the instructions further cause the one or more processors to remove the left merge candidate from the merge candidate set for prediction unit 1.

21. The non-transitory computer-readable storage medium of claim 18, wherein the one or more processors are configured to decode video data, and wherein the instructions further cause the one or more processors to:
   receive a syntax element indicating a selected merge candidate for the current prediction unit;
   perform the merge motion vector prediction process for the current prediction unit using the merge candidate set and the received syntax element to determine a motion vector for the current prediction unit; and
   decode the current prediction unit using the determined motion vector.

22. The non-transitory computer-readable storage medium of claim 18, wherein the one or more processors are configured to encode video data, and wherein the instructions further cause the one or more processors to:
   perform the motion vector prediction process for the current prediction unit using the merge candidate set to determine a selected merge candidate for the current prediction unit; and
   signal a syntax element indicating the selected merge candidate in an encoded video bitstream.

* * * * *